United States Patent
Szafron

(10) Patent No.: US 6,913,034 B2
(45) Date of Patent: Jul. 5, 2005

(54) EMERGENCY SHUTDOWN VALVE ACTUATOR

(76) Inventor: David Bruce Szafron, 8947-106 Avenue, Grande Prairie, Alberta (CA), T8X 1J5

( * ) Notice: Subject to any disclaimer, the term of this patent is extended or adjusted under 35 U.S.C. 154(b) by 30 days.

(21) Appl. No.: 10/454,931

(22) Filed: Jun. 5, 2003

(65) Prior Publication Data

US 2003/0226590 A1 Dec. 11, 2003

(30) Foreign Application Priority Data

Jun. 7, 2002 (CA) .................................. 2389836

(51) Int. Cl.[7] .............................................. F16K 27/12
(52) U.S. Cl. ........................................ 137/382; 251/14
(58) Field of Search .............................. 137/382, 377, 137/382.5; 251/14

(56) References Cited

U.S. PATENT DOCUMENTS

| | | | | |
|---|---|---|---|---|
| 2,964,054 A | * | 12/1960 | Weatherhead, Jr. | 137/382 |
| 3,954,251 A | | 5/1976 | Callahan, Jr. | 251/288 |
| 3,964,508 A | * | 6/1976 | Miller | 137/377 |
| 4,046,350 A | | 9/1977 | Massey et al. | 251/58 |
| 4,576,358 A | | 3/1986 | Mott et al. | 251/14 |
| 4,633,897 A | | 1/1987 | Effenberger | 137/315.35 |
| 4,650,153 A | | 3/1987 | Winegeart | 251/58 |
| 4,872,482 A | * | 10/1989 | Jarrett | 137/382.5 |
| 5,150,730 A | * | 9/1992 | Campbell | 137/377 |
| 5,340,078 A | * | 8/1994 | Dean | 137/377 |
| 5,954,088 A | | 9/1999 | Huang | 137/315.21 |
| 6,076,799 A | | 6/2000 | Baumann | |
| 6,216,724 B1 | | 4/2001 | Niinivaara | 137/318 |

* cited by examiner

Primary Examiner—Kevin Lee
(74) Attorney, Agent, or Firm—Davis & Bujold, P.L.L.C.

(57) ABSTRACT

An emergency shutdown valve actuator includes a support and a fluid activated actuator drive secured to the support. Clamps are provided for clamping the support onto a tubular member. A drive key is provided which is adapted to couple the actuator drive and a female receptacle of a valve member, such that movement of the actuator drive is transmitted via the drive key to the valve member to move the valve member between an open and a closed position. The actuator drive is coupled to a fluid source controlled from a remote control panel such that fluid is supplied to activate the actuator drive in the event of an emergency.

5 Claims, 6 Drawing Sheets

EMERGENCY SHUTDOWN VALVE ACTUATOR

FIELD OF THE INVENTION

The present invention relates to an emergency shutdown valve actuator.

BACKGROUND OF THE INVENTION

In some industries, for example the oil and gas industry, there are networks of piping with valves positioned to control flow at various positions in the network. There can be disastrous consequences if certain key valves are not immediately shut in the event of an emergency. Many installations still shut valves manually in the event of an emergency. There is, therefore, a danger that a valve will be left open due to human error in the face of an emergency resulting in property damage, injury or loss of life.

SUMMARY OF THE INVENTION

What is required is an emergency shutdown valve actuator which can be relied upon to close a selected valve should an emergency occur.

According to the present invention there is provided an emergency shutdown valve actuator which includes a support and a fluid activated actuator drive secured to the support. Means is provided for clamping the support onto a tubular member. A drive key is provided which is adapted to couple the actuator drive and a female receptacle of a valve member, such that movement of the actuator drive is transmitted via the drive key to the valve member to move the valve member between an open and a closed position. Means is provided for coupling the actuator drive to a fluid source controlled from a remote control panel such that fluid is supplied to activate the actuator drive in the event of an emergency.

The valve actuator, as described, clamps onto any tubular member which forms part of the network of piping of an industrial installation. The drive key is used to couple the actuator drive with the valve. In the event of an emergency, the actuator drive is activated by fluid to immediately shut the valve.

Although beneficial results may be obtained through the use of the emergency shutdown valve actuator, as described above, even more beneficial results may be obtained when a handle is connected to the drive key. This permits manual activation by personnel via the handle as an alternative to the actuator drive. Manual activation enables personnel in the vicinity to manually shut the valve before the emergency situation is even known by supervisory personnel at the control panel. It also provides a means for closing the valve, should it appear that the actuator drive is not responding.

It will be appreciated that various fluids can be used to activate the actuator drive. Beneficial results have been obtained through the use of air.

It is critical that the emergency shutdown valve actuator be capable of being relied upon should an emergency situation arise. However, when positioned on a network of piping there is always a possibility that the actuator drive could sustain damage. Even more beneficial results may, therefore, be obtained when the support has a seat surrounded by a protective cage. The actuator drive is positioned on and protected by the protective cage.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
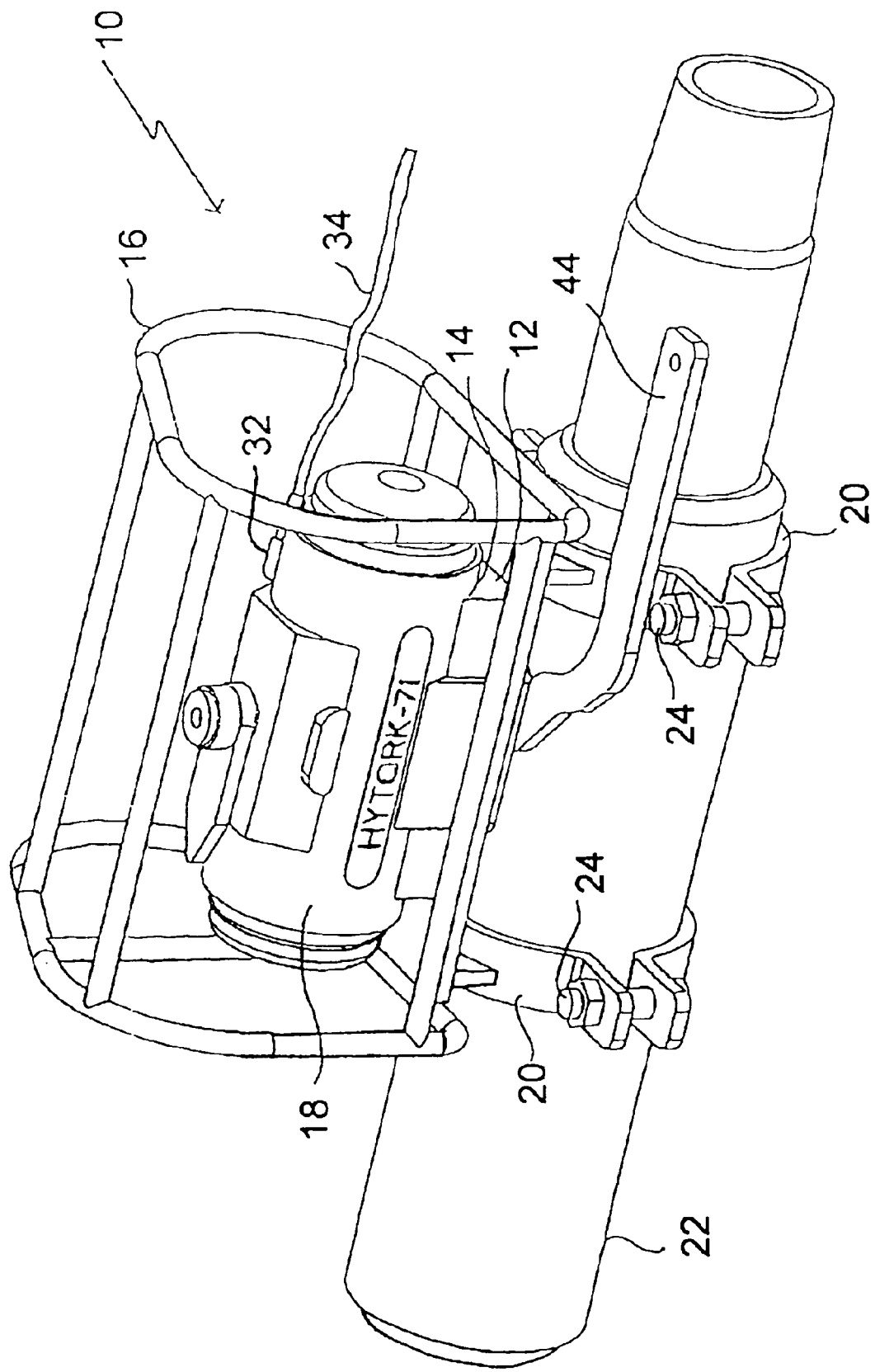
FIG. 1 is a perspective view of a emergency shutdown valve actuator constructed in accordance with the teachings of the present invention.
Figure 2:
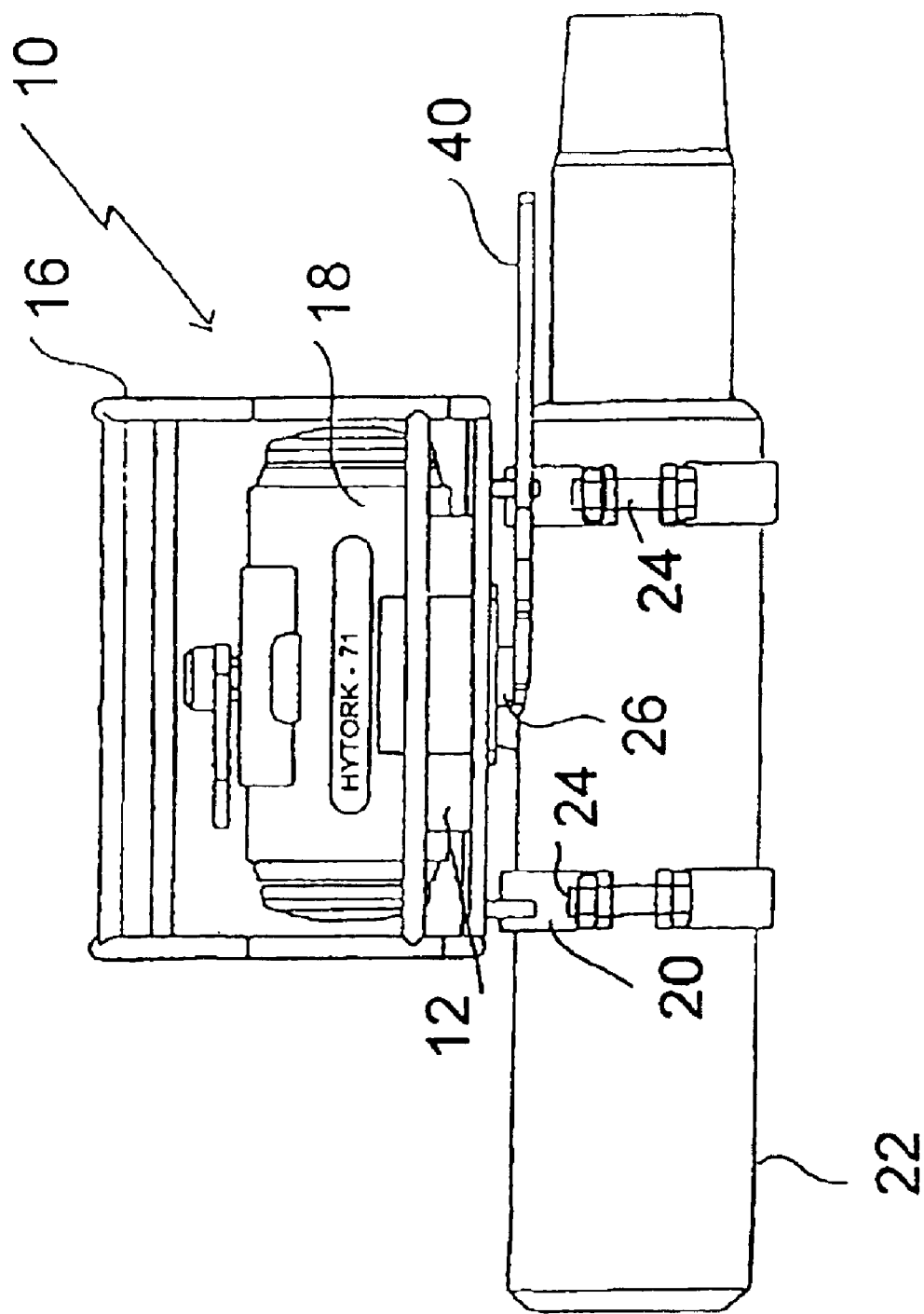
FIG. 2 is a side elevation view of the valve actuator illustrated in FIG. 1.

The preferred embodiment, an emergency shutdown valve actuator generally identified by reference numeral 10, will now be described with reference to FIGS. 1 through 7.

Structure and Relationship of Parts:

Referring to FIG. 1, valve actuator 10 includes a support 12 that has a seat 14 which is surrounded by a protective cage 16. A fluid activated actuator drive 18 is mounted on seat 14 of support 12 and is protected by protective cage 16. Clamps 20 are secured to support 12, whereby support 12 is clamped onto slim hole valve 22 although it can be clamped onto any tubular member which forms part of the network of piping of an industrial installation. Bolts 24 are used to maintain clamps 20 in position around slim hole valve 22.

Figure 4:
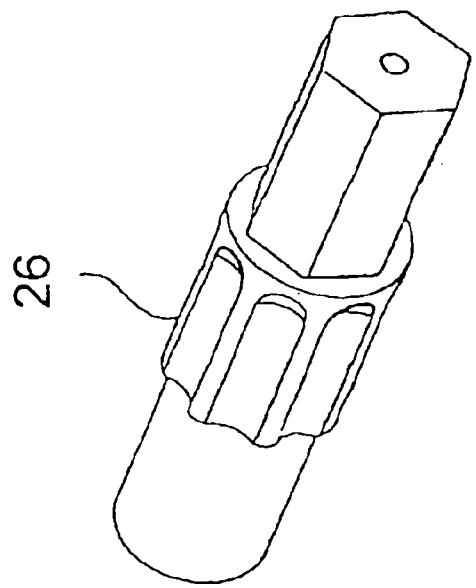
FIG. 4 is a perspective view of the drive key from the valve actuator illustrated in FIG. 1.
Figure 3:
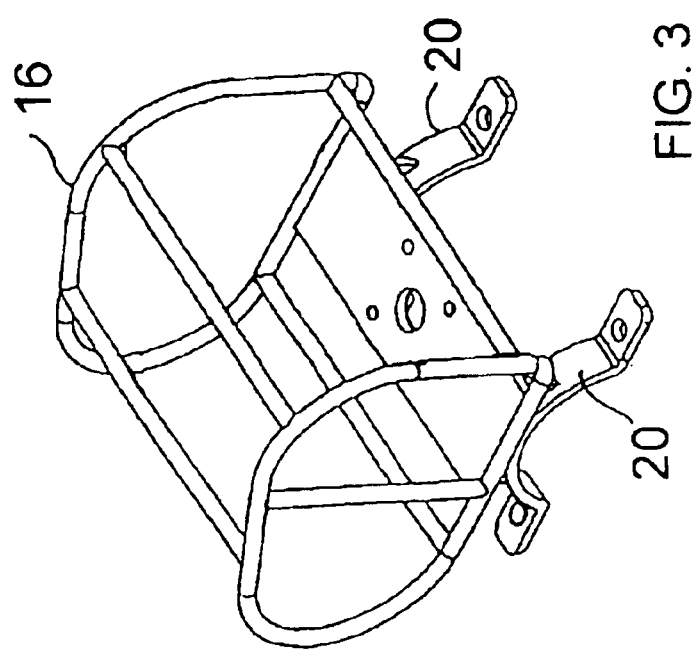
FIG. 3 is a perspective view of the support from the valve actuator illustrated in FIG. 1.
Figure 7:
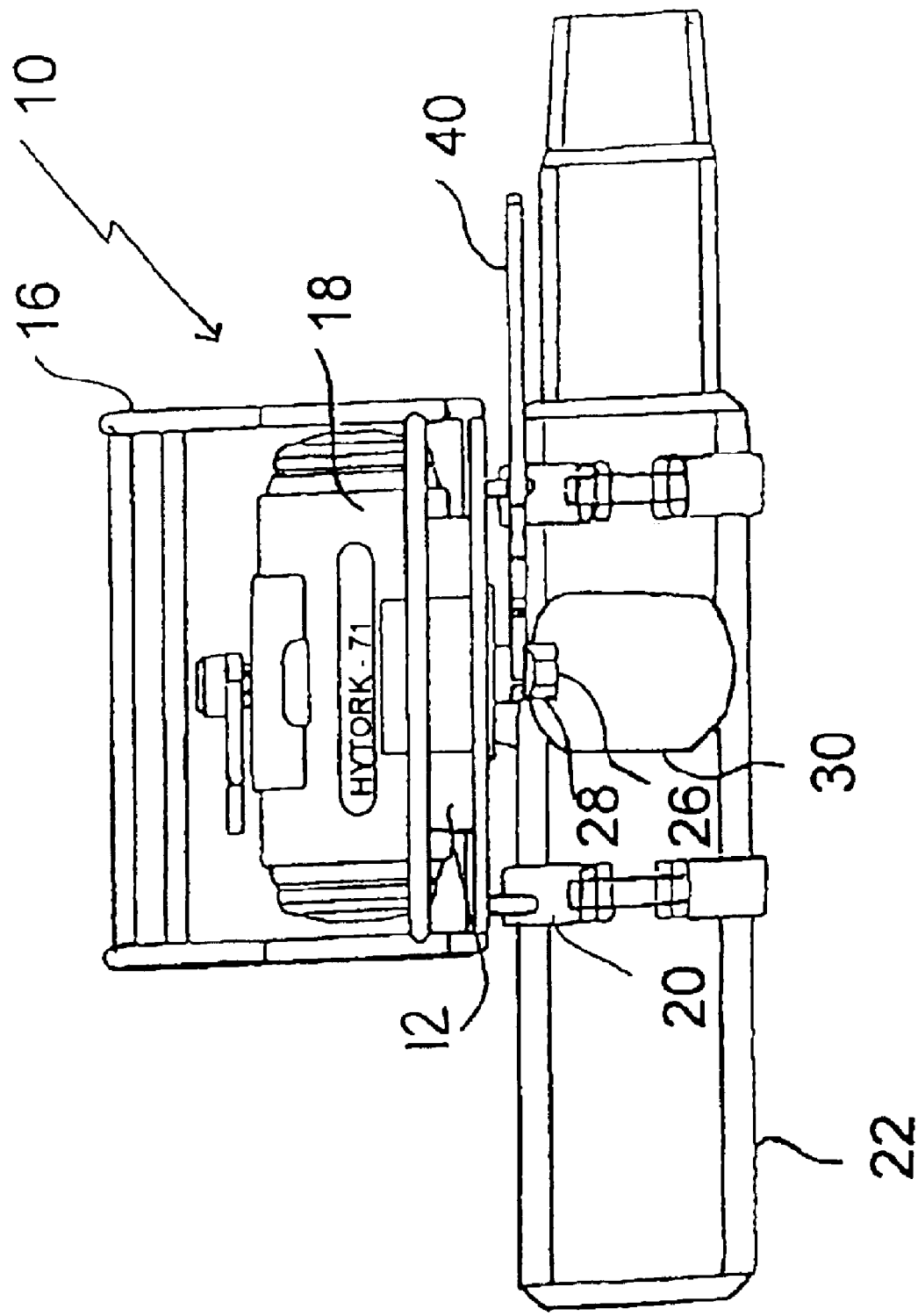
FIG. 7 is a side elevation view, in section, of the valve actuator illustrated in FIG. 1.

Referring to FIG. 7, a drive key 26 is provided which is adapted to couple actuator drive 18 and a female receptacle 28 of slim hole valve 22, such that movement of actuator drive 18 is transmitted via drive key 26 illustrated in FIG. 4, to a valve member 30 to move valve member 30 between an open and a closed position.

Figure 6:
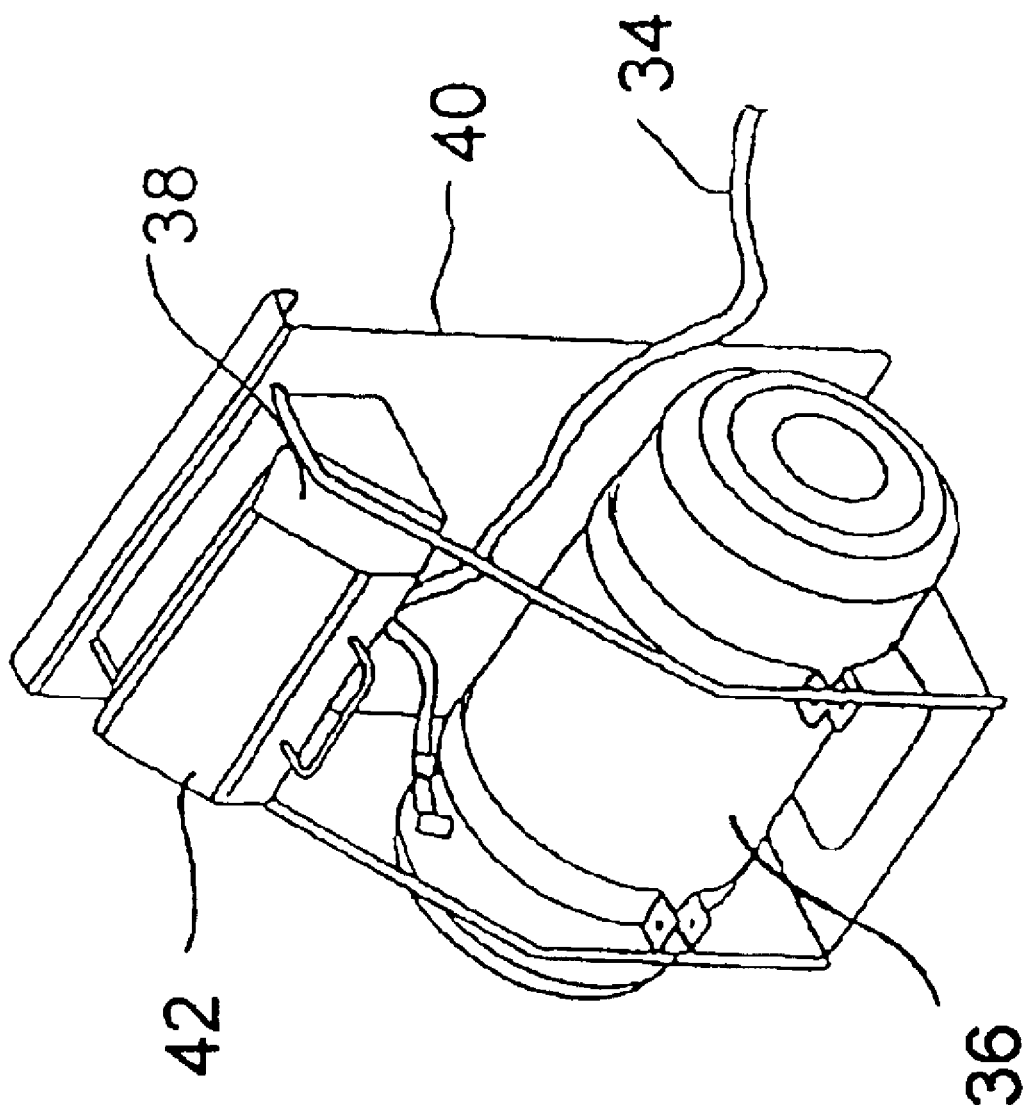
FIG. 6 is a perspective view of the remote control panel which is used in conjunction with the valve actuator illustrated in FIG. 1.

Referring to FIG. 1, fluid line couplings 32 are provided for coupling actuator drive 18 by fluid lines 34 to a fluid source such as an air tank 36 illustrated in FIG. 6. Referring to FIG. 6, air tank 36 is controlled from a remote control panel 38 such that fluid is supplied to activate actuator drive 18 illustrated in FIG. 1, in the event of an emergency. In the illustrated embodiment, fluid used to activate actuator drive 18 is air, however it will be appreciated that other fluids could also be used. In the illustrated embodiment, control panel 38 and air tank 36 are mounted on an upright stand 40 with control panel 38 being protected by a cover 42.

Figure 5:
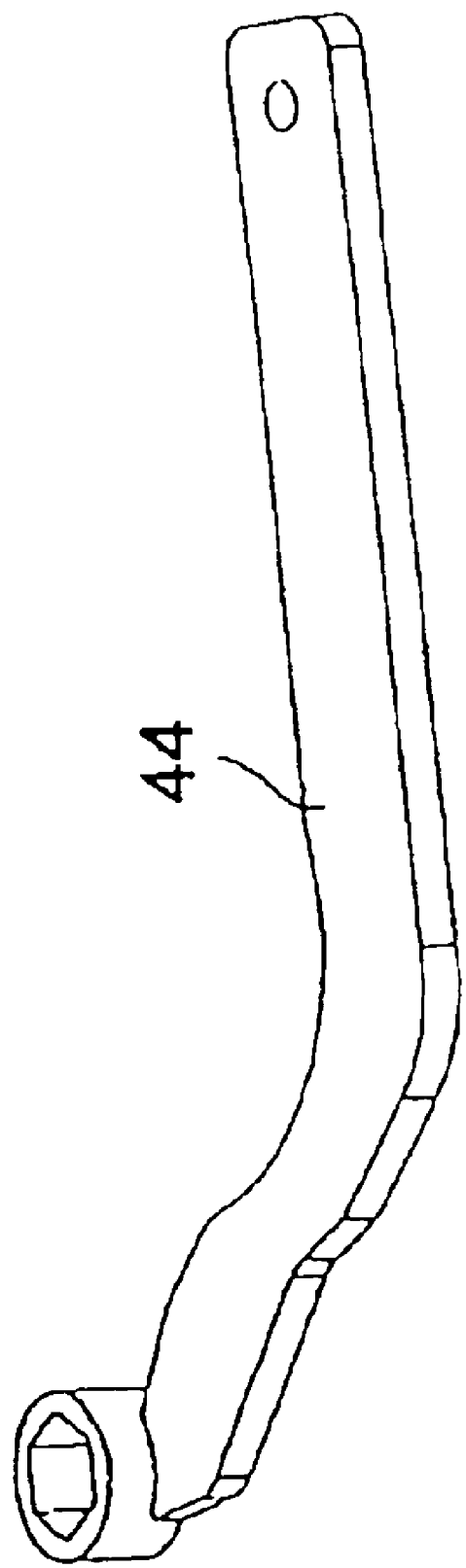
FIG. 5 is a perspective view of the handle from the valve actuator illustrated in FIG. 1.

Referring to FIG. 1, a handle 44 illustrated in FIG. 5, is connected to drive key 26, thereby permitting manual activation by personnel via handle 40 as an alternative to actuator drive 18.

Operation:

The use and operation of emergency shutdown valve actuator generally identified by reference numeral 10, will now be described with reference to FIGS. 1 through 7.

Referring to FIG. 1, in order to use fluid activated actuator drive 18, actuator drive 18 is mounted on seat 14 of support 12. Clamps 20 are bolted together with bolts 24 to mount support 12 to selected slim hole valve 22 such that drive key 26 couples with actuator drive 18 and female receptacle 28 of slim hole valve 22. Protective cage 16 serves to protect actuator drive 18 from sustaining damage during operation.

Referring to FIG. 1, in the event of an emergency, remote control panel 38 signals air tank 36 to supply air through fluid lines 34 to activate actuator drive 18. Referring to FIG. 7, upon activation, movement of actuator drive 18 is transmitted via drive key 26 to valve member 30 to move valve member 30 from an open position to a closed position thereby immediately shutting slim hole valve 22 down in the event of an emergency.

Referring to FIG. 1, as an alternative, handle 44 illustrated in FIG. 5, can be connected to drive key 26, thereby permitting manual activation by personnel via handle 44 which also result in slim hole valve 22 being shut down.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An emergency shutdown valve actuator, comprising:

a support;

a fluid activated actuator drive secured to the support;

a two part clamping assembly for clamping the support onto a tubular member, the clamping assembly being adapted to encircle and clamp around a tubular member; and a drive key adapted to couple the actuator drive and a female receptacle of a valve member, such that movement of the actuator drive is transmitted via the drive key to the valve member to move the valve member between an open and a closed position; and means for coupling the actuator drive to a fluid source controlled from a remote control panel such that fluid is supplied to activate the actuator drive in the event of an emergency; and a handle connected to the drive key, thereby permitting manual activation by personnel via the handle as an alternative to the actuator drive.

2. The emergency shutdown valve actuator as defined in claim 1, wherein the fluid used to activate the actuator driver.

3. The emergency shutdown valve actuator as defined in claim 1, wherein the support has a seat surrounded by a protective cage, the actuator drive being positioned on and protected by the protective cage.

4. An emergency shutdown valve actuator, comprising:

a support having a seat surrounded by a protective cage;

a fluid activated actuator drive mounted on the seat of the support and protected by the protective cage;

clamps secured to the support, whereby the support is clamped onto a tubular member; and a drive key adapted to couple the actuator drive and a female receptacle of a valve member, such that movement the actuator drive transmitted via the drive key to the valve member to move the valve member between an open and a closed position;

fluid line couplings for coupling the actuator drive by fluid lines to a fluid source controlled from a remote control panel such that fluid is supplied to activate the actuator drive in the event of an emergency; and a handle connected to the drive key, thereby permitting manual activation by personnel via the handle as an alternative to the actuator drive.

5. The emergency shutdown valve actuator as defined in claim 4, wherein the fluid used to activate the actuator drive is air.

* * * * *